(12) United States Patent
Kim et al.

(10) Patent No.: US 7,918,428 B2
(45) Date of Patent: Apr. 5, 2011

(54) SUPPORTING APPARATUS OF DISPLAY DEVICE

(75) Inventors: Byung Hee Kim, Gumi (KR); Tae Gewn Kim, Gumi (KR); Kyung Wook Kim, Gumi (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 12/350,018

(22) Filed: Jan. 7, 2009

(65) Prior Publication Data

US 2009/0308999 A1 Dec. 17, 2009

(30) Foreign Application Priority Data

Jun. 16, 2008 (KR) .................. 10-2008-0056243
Jun. 16, 2008 (KR) .................. 10-2008-0056244

(51) Int. Cl.
*A47F 1/10* (2006.01)
(52) U.S. Cl. ................. 248/295.11; 248/917; 248/919
(58) Field of Classification Search ........... 248/295.11, 248/285.1, 917, 919, 920, 923, 201, 222.11, 248/222.13, 222.51, 337
See application file for complete search history.

(56) References Cited

FOREIGN PATENT DOCUMENTS

| KR | 10-2002-0035062 | 5/2002 |
| KR | 10-2002-0092698 | 12/2002 |
| KR | 10-2007-0022911 | 2/2007 |

OTHER PUBLICATIONS

Video Furniture Iinternational, http://www.video-furn.com.*
International Search Report dated Apr. 30, 2009.

* cited by examiner

*Primary Examiner* — Terrell Mckinnon
*Assistant Examiner* — Erin Smith
(74) *Attorney, Agent, or Firm* — KED & Associates, LLP

(57) ABSTRACT

A supporting apparatus of a display device is provided that includes a fixing unit, one or more sliding units, and a device connecting part. The fixing unit may be fixed to a mounting position. The sliding units may be rotatably connected to the fixing unit. The device connecting part may be rotatable relative to the sliding unit and may be coupled with the display device. The sliding unit may include a first sliding member rotatable relative to the fixing unit, and a second sliding member slidable relative to the first sliding member.

19 Claims, 9 Drawing Sheets

【Figure 1】
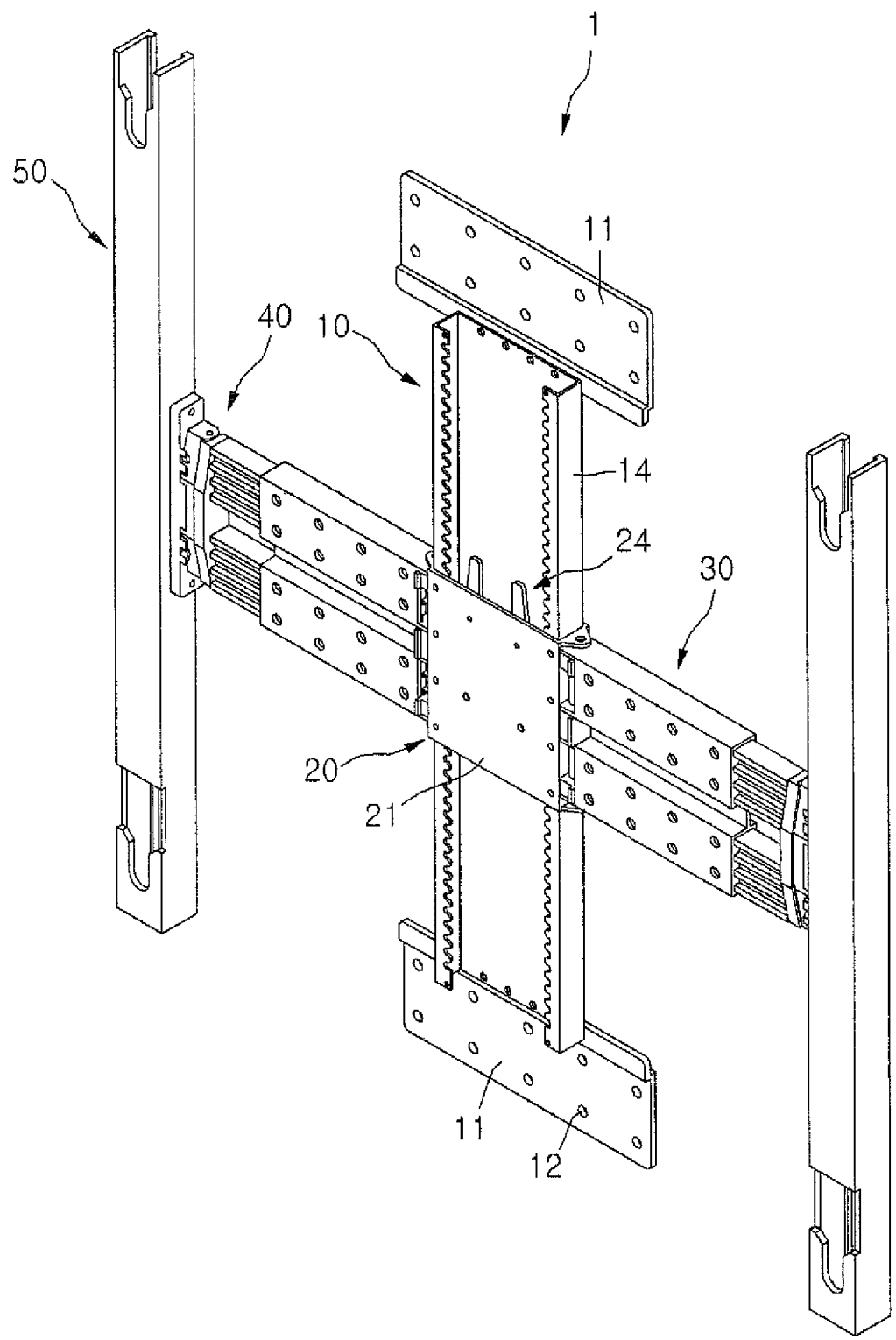

【Figure 2】
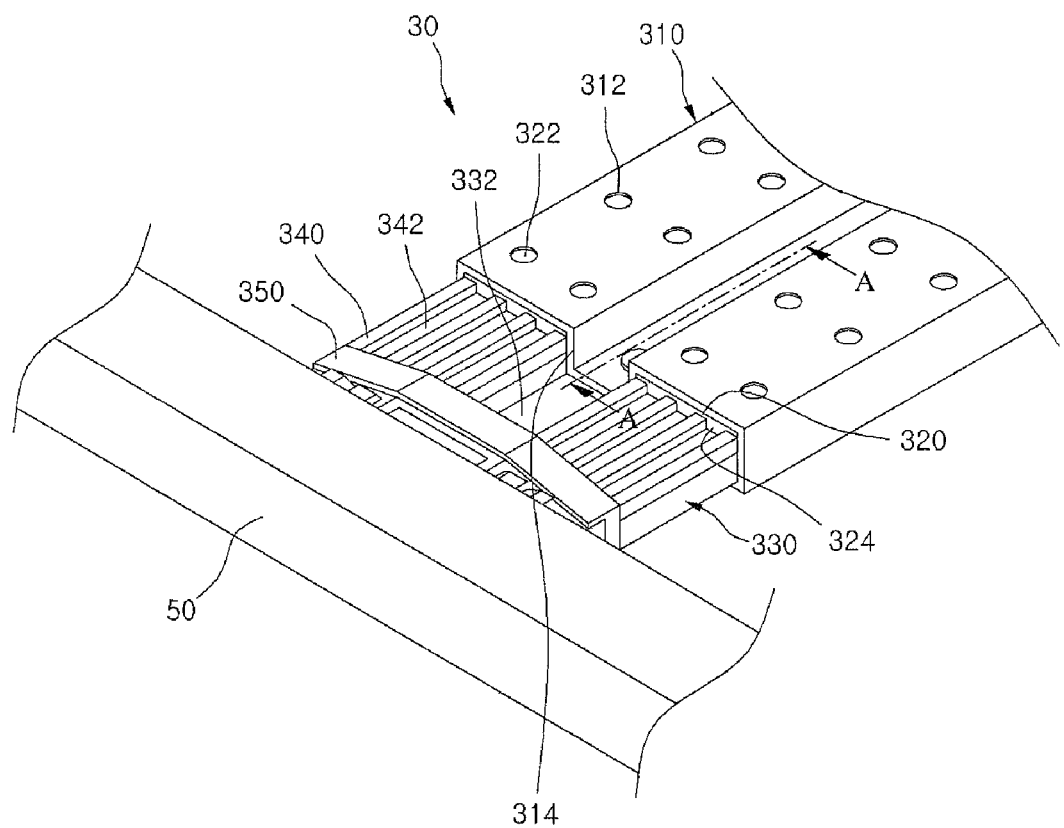
【Figure 3】
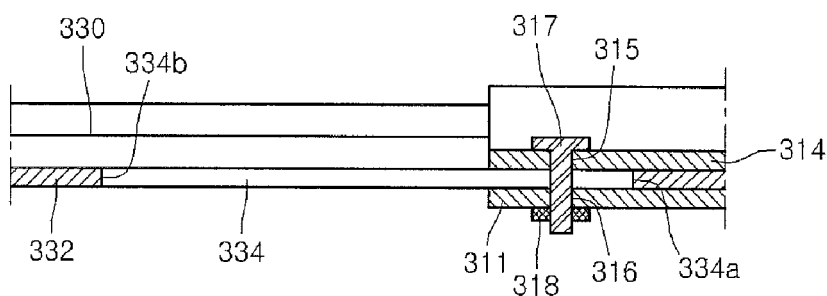

[Figure 4]
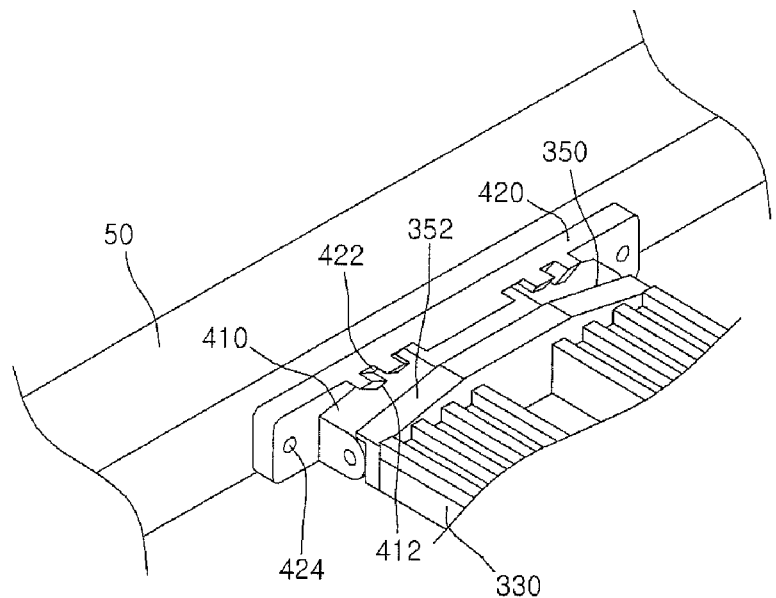
[Figure 5]
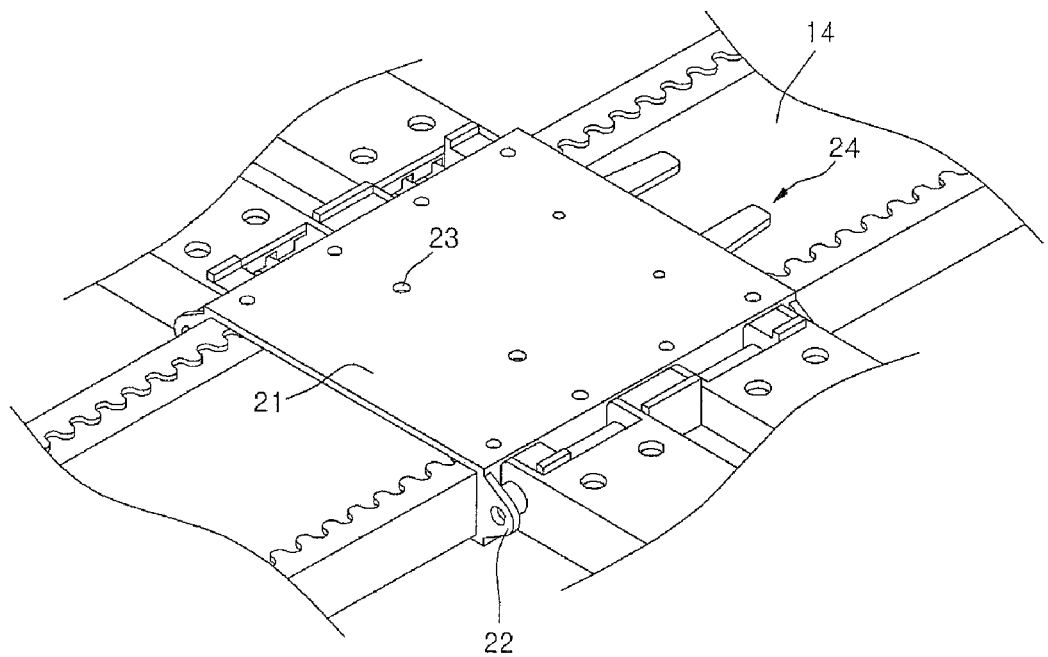

[Figure 6]
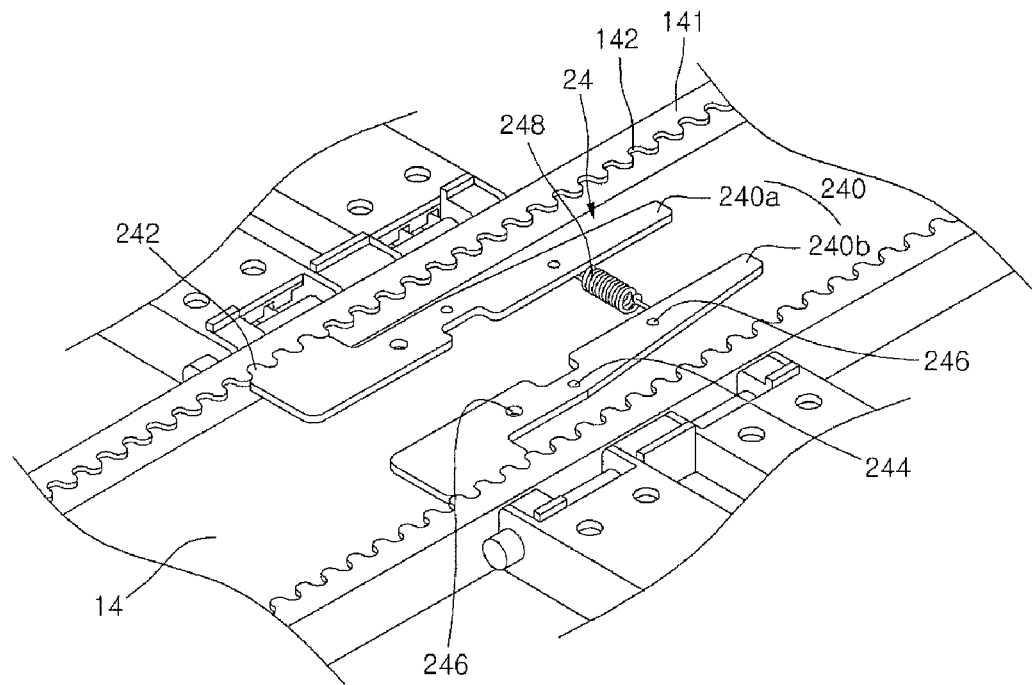
[Figure 7]
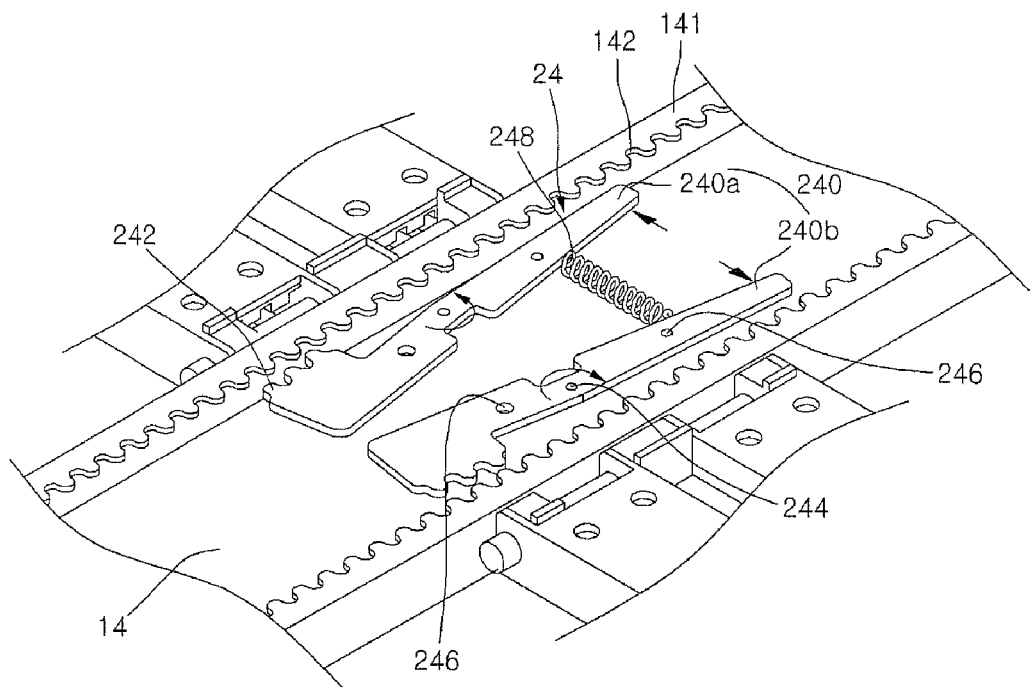

【Figure 8】
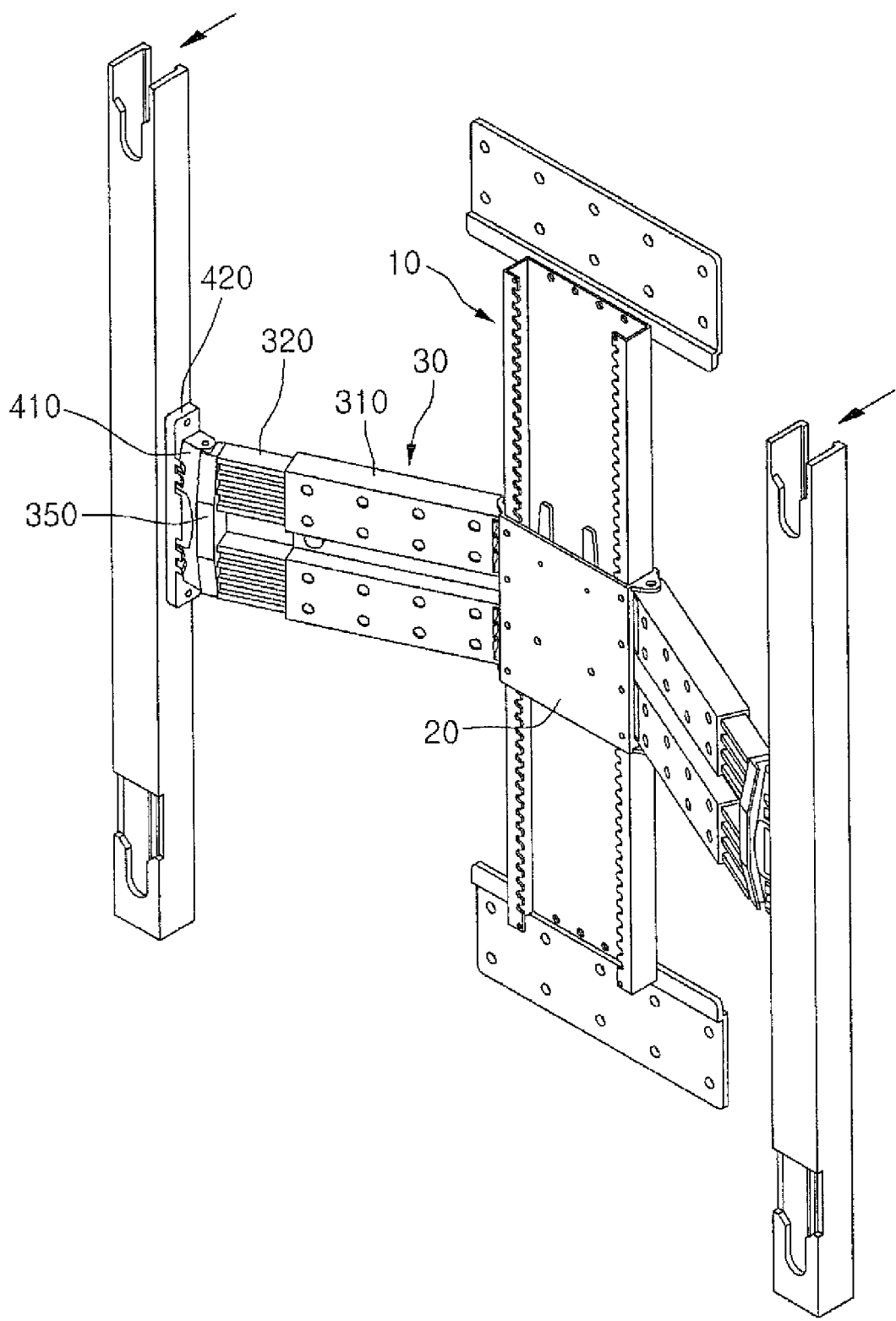

【Figure 9】
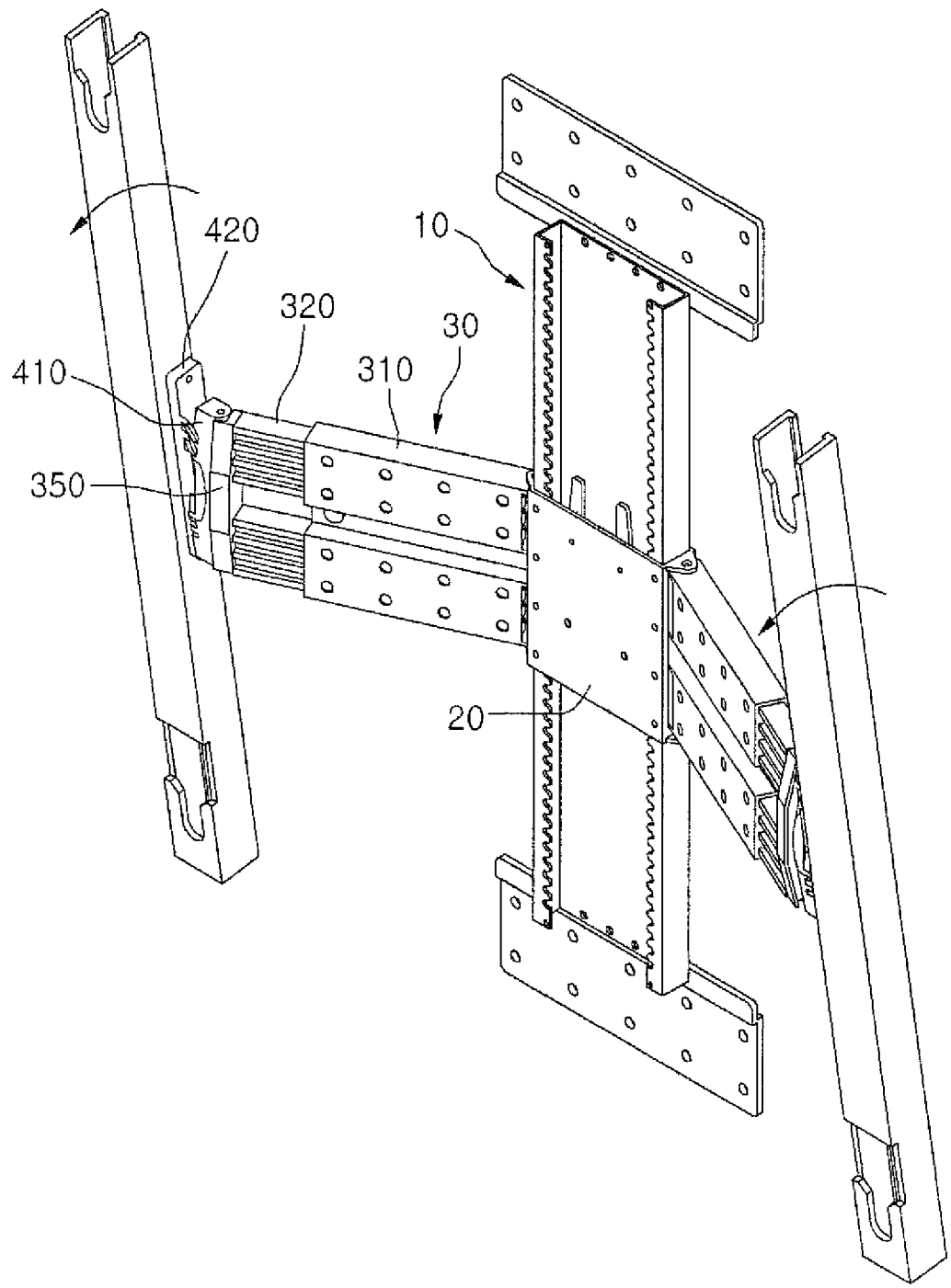

【Figure 10】
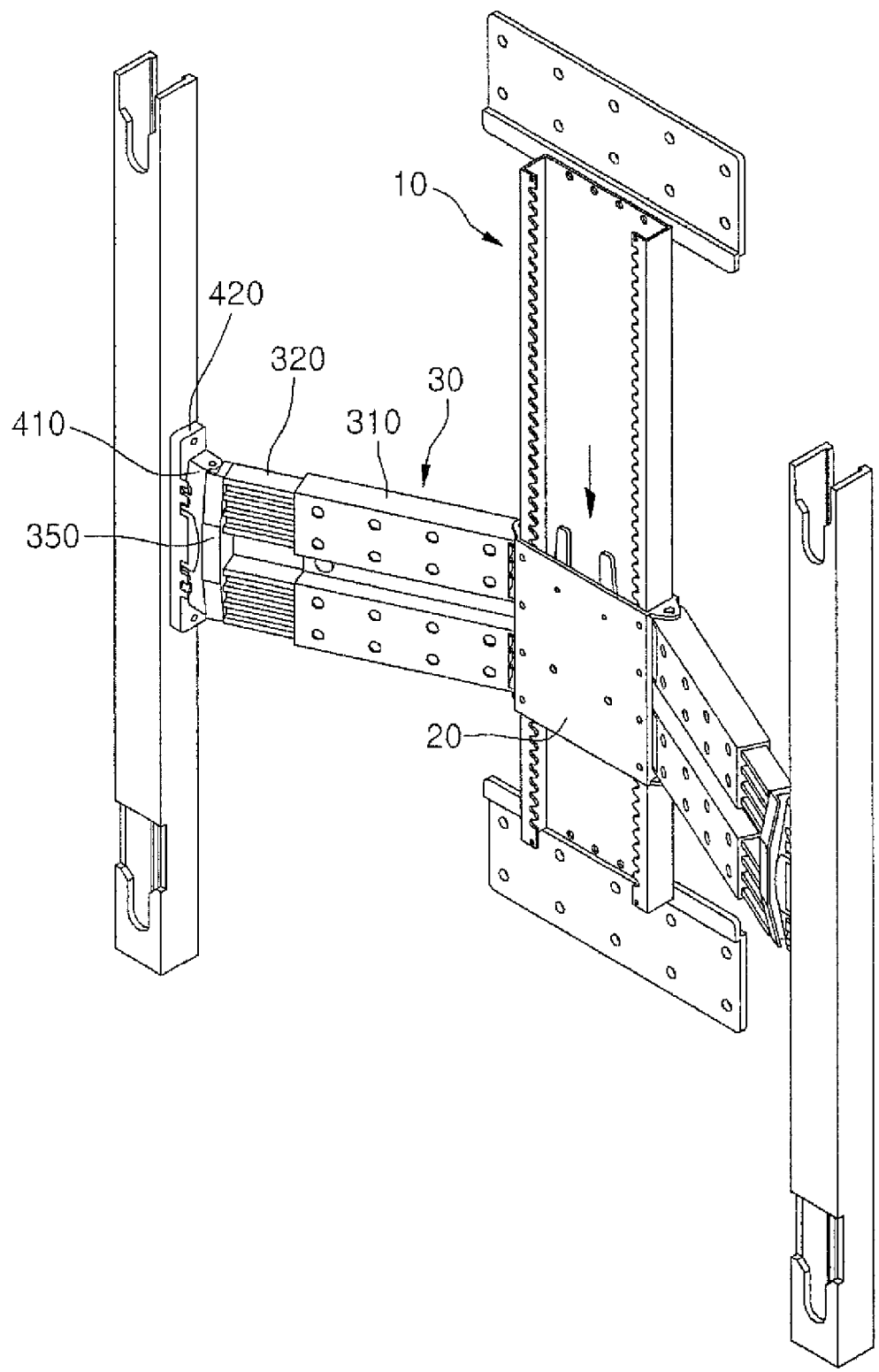

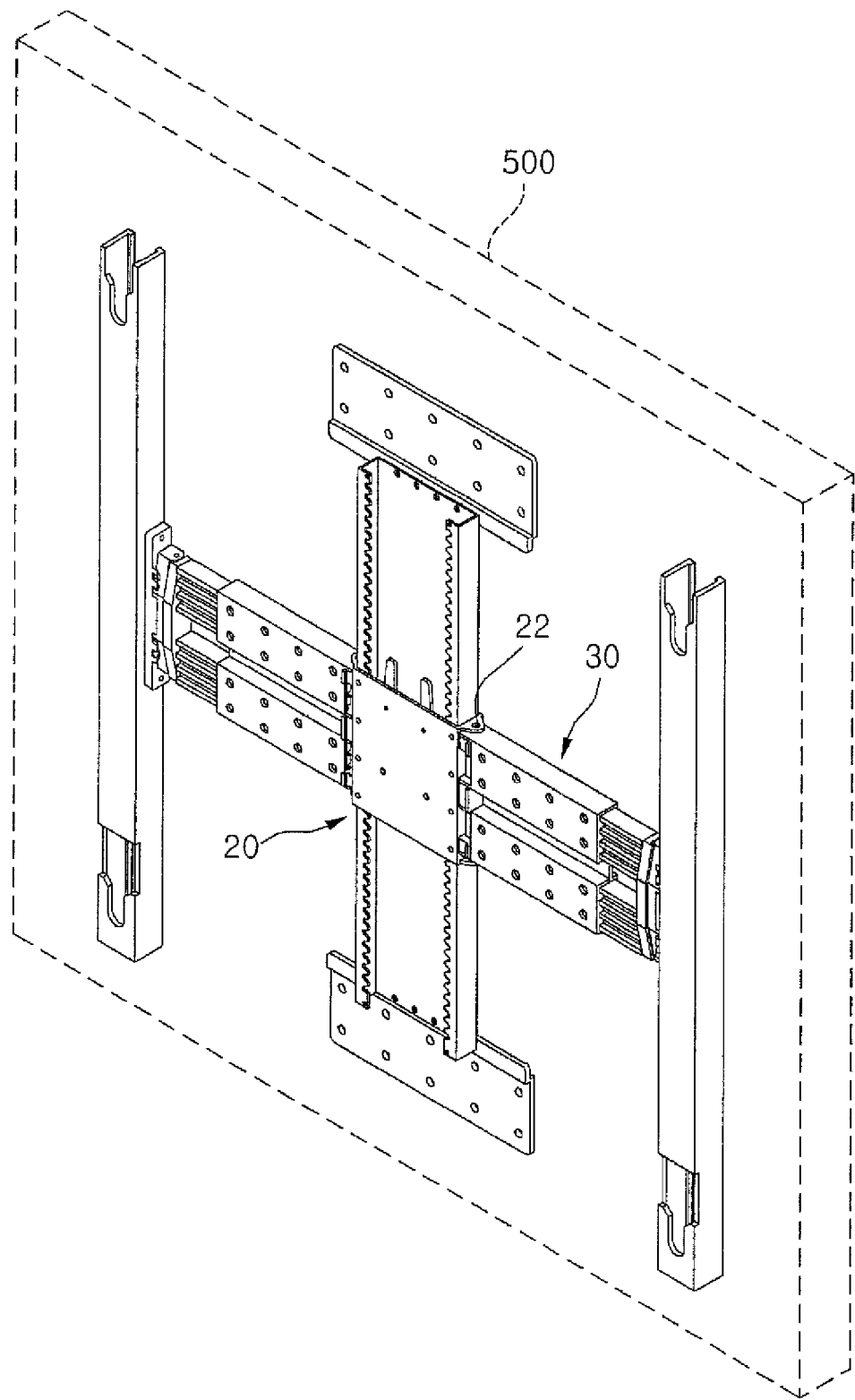
【Figure 11】

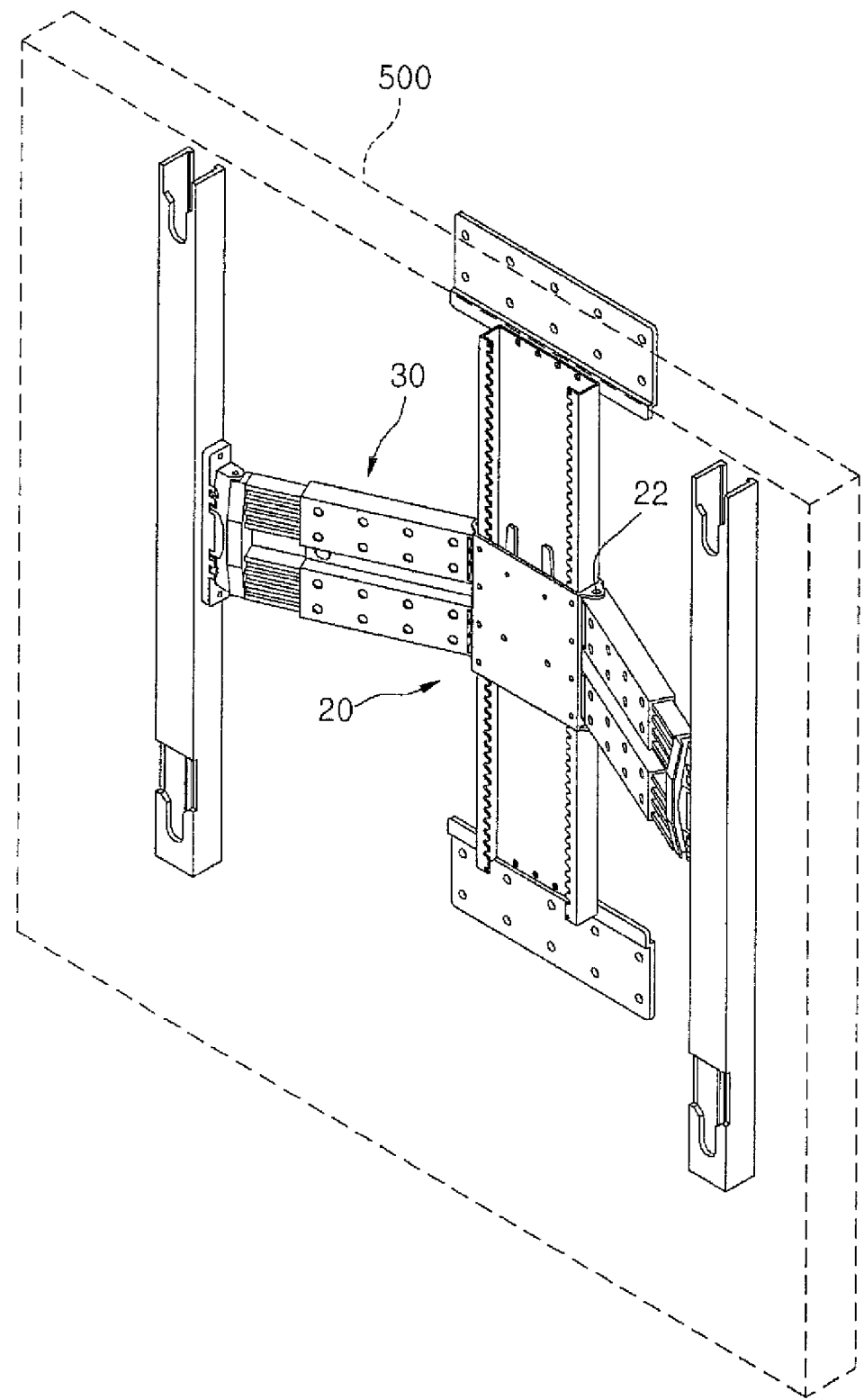
[Figure 12]

US 7,918,428 B2

SUPPORTING APPARATUS OF DISPLAY DEVICE

The present application claims priority from Korean Patent Application No. 10-2008-0056243, filed Jun. 16, 2008 and Korean Patent Application No. 10-2008-0056244, filed Jun. 16, 2008, the subject matters of which are hereby incorporated by reference.

BACKGROUND

1. Field

The present disclosure may relate to a display device, and more particularly, may relate to an apparatus to support a display device.

2. Background

Display devices may be used for watching images. Flat display devices having an almost two-dimensional flat structure are being widely released. Since the flat display devices are lightweight, the devices may be mounted to walls. Supporting apparatuses for various wall-mount-type display devices are therefore being introduced.

Such a supporting apparatus may include a fixing unit for fixing (or attaching) to a wall, a device connecting part on which a display device is placed, and a connection unit that connects the fixing unit to the device connecting part. The connection unit may include a plurality of links. Through operation of the links, the display device may move back and forth and swivel left and right relative to the wall.

The links may perform the back-and-forth movement of the display device, and thus stress may concentrate on hinge shafts of the respective links so that the supporting apparatus is susceptible to breakage.

The links may also overlap each other, and thus a back-and-forth width of the supporting apparatus may be increased, which may increase a distance from the wall to the display device.

BRIEF DESCRIPTION OF THE DRAWINGS

Embodiments may be described in detail with reference to the following drawings in which like reference numerals refer to like elements and wherein:

FIG. 1 is a perspective view illustrating a supporting apparatus of a display device according to an example embodiment;

FIG. 2 is a perspective view illustrating structure of a sliding unit according to an example embodiment;

FIG. 3 is a cross-sectional view taken along line A-A of FIG. 2;

FIG. 4 is a perspective view illustrating structure of a tilting friction part according to an example embodiment;

FIG. 5 is a perspective view illustrating structure of a height adjustment unit according to an example embodiment;

FIG. 6 is a perspective view illustrating the height adjustment unit of FIG. 5 with an up-and-down movement part removed;

FIG. 7 is a perspective view illustrating the height adjustment unit of FIG. 6 with a movement maintaining device released from a frame;

FIG. 8 is a view illustrating a forward movement operation of a supporting apparatus according to an example embodiment;

FIG. 9 is a view illustrating an up-and-down tilting operation of a supporting apparatus;

FIG. 10 is a view illustrating an up-and-down movement operation of a supporting apparatus; and FIGS. 11 and 12 are views illustrating a back-and-forth operation of an image display panel coupled to a supporting apparatus.

DETAILED DESCRIPTION

FIG. 1 is a perspective view illustrating a supporting apparatus of a display device according to an example embodiment. Other embodiments and configurations are also within the scope of the present invention.

As shown in FIG. 1, a supporting apparatus 1 of a display device may include a fixing unit 10, a height adjustment unit 20, a plurality of sliding units 30, a plurality of device connecting parts 50, and tilting friction parts 40. The fixing unit 10 may be fixed or attached to a mounting position such as a wall. The height adjustment unit 20 may be movable up and down relative to the fixing unit 10. The sliding units 30 may be rotatably connected to both sides of the height adjustment unit 20. The device connecting parts 50 may be respectively rotatable up and down relative to the sliding units 30, and the display device may be placed on seats of the device connecting parts 50. The tilting friction parts 40 may be disposed between the sliding units 30 and the device connecting parts 50 and may provide a friction force against an up-and-down tilting movement.

The height adjustment unit 20 may vertically move along the fixing unit 10, and may be fixed after any movement using a coupling guide of the fixing unit and a movement maintaining device of the height adjustment unit 20. Since the sliding units 30 respectively include a plurality of sliding members, the device connecting parts 50 may be moved back and forth by sliding operation of the sliding members.

The tilting friction parts 40 may be disposed between the sliding units 30 and the device connecting parts 50, and provide a friction force to maintain a tilting position of the device connecting parts 50. That is, when a user tilts an image display panel, the tilting friction parts 40 may provide friction force to the device connecting parts 50 to maintain the tilting position of the device connecting parts 50 coupled to the image display panel.

The fixing unit 10 may include a vertically elongated frame 14 that guides vertical movement of the height adjustment unit 20. The fixing unit 10 may also include install brackets 11 coupled to upper and lower sides of the frame 14 to be fixed to a wall, for example. The install brackets 11 may be provided with a plurality of holes 12 through which a coupling member (including a screw) passes.

The height adjustment unit 20 may include a movement member 21 that vertically moves along the fixing unit 10, and a movement maintaining device 24 to fix (or maintain) the movement member 21 at a moved position of the movement member 21.

The sliding units 30 may be rotatably coupled to the both sides of the height adjustment unit 20. Thus, the fixing unit 10 may be disposed in a middle of the supporting apparatus 1, and the respective sliding units 30 are rotatable left and right relative to the fixing unit 10.

The fixing unit 10 may be disposed in the middle of the supporting apparatus 1, thereby minimizing a limit of an install position of the supporting apparatus 1. That is, since the fixing unit 10 can be fixed to a narrow wall or a narrow indoor column, the install position of the supporting apparatus 1 may be diversified.

FIG. 2 is a perspective view illustrating structure of a sliding unit (such as the sliding unit 30) according to an example embodiment. FIG. 3 is a cross-sectional view taken along line A-A of FIG. 2. Other embodiments and configurations are also within the scope of the present invention.

As shown in FIGS. 2 and 3, the sliding unit 30 includes a first sliding member 310 rotatably coupled to the height adjustment unit 20, and a second sliding member 330 capable of sliding relative to the first sliding member 310. The second sliding member 330 includes a rotation guide 350 to couple to the tilting friction part 40. The second sliding member 330 may slide relative to the first sliding member 310 when the device connecting part 50 moves relative to the fixing unit 10.

The first sliding member 310 includes a sliding guide 314 for guiding the sliding of the second sliding member 330 relative to the first sliding member 310. The sliding guide 314 is recessed from an outside of the first sliding member 310 to an inside of the first sliding member 310. The sliding guide 314 is disposed in a sliding direction of the second sliding member 330 relative to the first sliding member 310.

At least a portion of the second sliding member 330 slides into and out of an inner space of the first sliding member 310. The second sliding member 330 includes a guide-receiving part 332 for receiving the sliding guide 314. The guide-receiving part 332 is recessed in a side surface of the second sliding member 330. The shape and size of the guide-receiving part 332 correspond to the shape and size of the sliding guide 314.

The first sliding member 310 includes a first guide member 320 on the inside thereof. The first guide member 320 may improve strength of the first sliding member 310 and may guide the sliding of the second sliding member 330 relative to the first sliding member 310. The second sliding member 330 includes a second guide member 340 on an outside thereof, that interacts with the first guide member 320.

The first guide member 320 may include a plurality of coupling protrusions 322 that are provided on a first side surface of the first guide member 320 and are coupled to the first sliding member 310. The first sliding member 310 may include protrusion through holes 312 through which the coupling protrusions 322 may pass.

A plurality of guide ribs 324 may protrude from a second side surface of the first guide member 320. The guide ribs 324 may be spaced from each other in a direction perpendicular to a sliding direction of the second sliding member 330. The respective guide ribs 324 may extend in the sliding direction of the second sliding member 330. The second guide member 340 may include a plurality of rib insertion grooves 342 into which the respective guide ribs 324 are inserted.

In at least one embodiment, the first guide member 320 is provided with the guide ribs 324, and the second guide member 340 is provided with the rib insertion grooves 342. However, the first guide member 320 may also be provided with a plurality of rib insertion grooves, and the second guide member 340 may be provided with a plurality of guide ribs.

In at least one embodiment, the first sliding member 310 may be provided with the first guide member 320 including the guide ribs 324, and the second sliding member 330 may be provided with the second guide member 340 including the rib insertion grooves 342. However, the first sliding member 310 may also be provided with a plurality of protruding guide ribs, and the second sliding member 330 may also be provided with a plurality of recessed rib insertion grooves.

As shown in FIG. 3, the sliding guide 314 and a side surface 311 of the first sliding member 310 facing the sliding guide 314 may be coupled with a limit-setting guide 317 that sets a sliding limit of the second sliding member 330 relative to the first sliding member 310.

The sliding guide 314 and the side surface 311 of the first sliding member 310 respectively include a first through hole 315 and a second through hole 316 that receives the limit-setting guide 317.

The second sliding member 330 includes an opening 334 that receives the limit-setting guide 317. The opening 334 may be elongated in the sliding direction of the second sliding member 330. In a state where the limit-setting guide 317 has passed through the opening 334, the second sliding member 330 may slide relative to the first sliding member 310.

The limit-setting guide 317 may sequentially penetrate the first through hole 315, the opening 334, and the second through hole 316. The limit-setting guide 317 that has passed through the second through hole 316 may be coupled with a fixing member 318 to prevent the limit-setting guide 317 from being removed from the first through hole 315, the second through hole 316, and the opening 334. For example, the limit-setting guide 317 may include a screw, and the fixing member 318 may be a nut coupled to the screw. The structure of the limit-setting guide 317 and the fixing member 318 is not limited to this structure and configuration.

When a first end 334a of the opening 334 comes in contact with the limit-setting guide 317 while the second sliding member 330 moves to a left side, the second sliding member 330 may no longer slide to the left side. On the other hand, when a second end 334b of the opening 334 comes in contact with the limit-setting guide 317 while the second sliding member 330 moves to a right side, the second sliding member 330 may no longer slide to the right side.

The second sliding member 330 may slide by a length of the opening 334. More particularly, the second sliding member 330 may slide by a length of the opening 334 with the left-and-right width of the limit-setting guide 317 subtracted from an entire length of the opening 334. The length of the opening 334 may be adjusted according to a kind of a display device, thereby adjusting a forward movement distance of the display device.

FIGS. 11 and 12 show an image display panel 500 of the display device that moves back and forth.

The rotation guide 350 may be rotatably coupled to the tilting friction part 40. When the display device moves forward, the rotation guide 350 allows the tilting friction part 40 to rotate with respect to the rotation guide 350 so that the display device can move forward while maintaining a constant distance between the device connecting parts 50.

That is, when the sliding units 30 slide in a state where the tilting friction parts 40 do not rotate relative to the respective sliding units 30, the distance between the device connecting parts 50 may change. In order to maintain the constant distance between the device connecting parts 50 (i.e., at a position fixed to the display image panel), the tilting friction parts 40 may be rotatable relative to the rotation guides 350.

Since the device connecting parts 50 move back and forth in the state the display device is placed on the device connecting parts 50, the left-and-right distance between the device connecting parts 50 may be maintained constant. As such, to move the device connecting parts 50 back and forth in the state where the left-and-right distance between the device connecting parts 50 is maintained constant, the tilting friction parts 40 may rotate relative to the sliding units 30.

FIG. 4 is a perspective view illustrating structure of a tilting friction part (such as the tilting friction part 40) according to an example embodiment. Other embodiments and configurations are also within the scope of the present invention.

As shown in FIG. 4, the tilting friction part 40 includes a first arc member 410 coupled to the rotation guide 350 (of the sliding unit 30), and a second arc member 420 coupled to the device connecting part 50. The second arc member 420 may move relative to the first arc member 410.

Interfaces of the respective first and second arc members 410 and 420 may be provided with a plurality of friction recesses 412 and 422 having an arc shape, which have an identical center of rotation at a specific position. The friction recesses 412 and 422 of the respective arc members 410 and 420 may be fitted onto each other. That is, the respective arc members 410 and 420 may be provided in a concave-convex structure such that protrusions of the first arc member 410 are inserted into the friction recesses 422 of the second arc member 420, and simultaneously protrusions of the second arc member 420 are inserted into the friction recesses 412 of the first arc member 410.

Such arc members are respectively provided with the corresponding friction recesses 412 and 422, thereby improving a friction force and obtaining a great friction force using a small member. This may reduce the size of components of a supporting apparatus. For example, the respective arc members 410 and 420 may be formed of resin. Such resin may reduce noise generated from interfaces of the respective friction recesses 412 and 422 and improve the friction force.

The second arc member 420 may be coupled to the device connecting part 50 through a coupling member, and the second arc member 420 may be provided with coupling holes 424 for coupling to the coupling member.

The rotation guide 350 may be provided with a stopper 352 to set a rotation limit of the tilting friction part 40 when the device connecting part 50 moves rearward. As shown in FIG. 4, in a state where the device connecting part 50 and the sliding unit 30 are parallel to each other, the stopper 352 may come in close contact with a front surface of the first arc member 410 to prevent rotation of the first arc member 410, and thus prevent (or minimize) the device connecting part 50 from moving rearward.

FIG. 5 is a perspective view illustrating structure of a height adjustment unit according to an example embodiment. FIG. 6 is a perspective view illustrating the height adjustment unit 20 of FIG. 5 with the movement member 21 removed. FIG. 7 is a perspective view illustrating the height adjustment unit 20 of FIG. 6 with the movement maintaining device 24 released from the frame 14. Other embodiments and configurations are also within the scope of the present invention.

As shown in FIGS. 5 to 7, the movement member 21 may vertically slide along the frame 14 while at least partially surrounding the frame 14. In order to prevent the movement member 21 from being removed ahead of the frame 14, the movement member 21 may surround the entire front surface of the frame 14 and at least a portion of a rear surface of the frame 14.

Both side surfaces and a rear surface of the movement member 21 may be referred to as removal prevention parts for preventing the movement member 21 from being removed ahead of the fixing unit 10. The removal prevention parts may guide the movement member 21 to slide relative to the frame 14 that extends along the fixing unit 10.

The movement maintaining device 24 may be rotatably coupled to an inside of the movement member 21 through a hinge member so as to vertically move together with the movement member 21.

When the height of the movement member 21 has been adjusted, the movement maintaining device 24 may be coupled to the frame 14 to maintain the movement member 21 relative to the frame 14 (or the fixing unit 10).

Two sets of coupling parts 22 are respectively disposed on both sides of the movement member 21 to hinge the movement member 21 to the sliding units 30. Thus, the sliding units 30 may be rotatable back and forth about the coupling parts 22. When the sliding units 30 slide simultaneously with rotating about the coupling parts 22, the image display panel 500 disposed ahead of the sliding units 30 may move back or forth.

A front surface of the movement member 21 may be provided with a plurality of coupling holes 23 through which a coupling member may pass. The coupling member may couple the movement maintaining device 24 to the movement member 21 in a state where the movement maintaining device 24 is fixed to the frame 14.

That is, the movement maintaining device 24 and the frame 14 may be selectively coupled to each other through operation of the movement maintaining device 24. The movement maintaining device 24 may be coupled to the movement member 21 in the state where the movement maintaining device 24 is coupled to the frame 14 so as to prevent movement of the movement maintaining device 24, thereby maintaining the state where the movement maintaining device 24 is coupled to the frame 14.

The movement maintaining device 24 may include a couple of operation levers 240 and an elastic member 248. The operation levers 240 may include a first operation lever 240a and a second operation lever 240. The operation levers 240a and 240b may face each other.

Coupling guides 141 are respectively disposed on both sides of the frame 14 such that the operation levers 240 are selectively coupled to the coupling guides 141. The coupling guides 141 are disposed in a vertical direction of the frame 14.

Surfaces of the respective coupling guides 141 facing each other may be provided with a plurality of catch recesses 142. Outside surfaces of the respective operation levers 240 may be respectively provided with a plurality of catch protrusions 242 inserted into portions of the catch recesses 142.

Each operation lever 240 may be provided with the catch protrusions 242, and the catch protrusions 242 may be selectively inserted into portions of the catch recesses 142, respectively. As such, the catch protrusions 242 may be inserted into the catch recesses 142, so that the operation levers 240 and the frame 14 are firmly coupled to each other.

In this embodiment, the coupling guides 141 are provided with the catch recesses 142, and the operation levers 240 are provided with the catch protrusions 242 such that the protrusions are respectively disposed between the catch recesses 142, and the recesses are respectively disposed between the catch protrusions 242. Thus, the coupling guides 141 and the operation levers 240 respectively include concave-convex portions for engaging with each other.

The elastic member 248 may be provided between the operation levers 240. One end of the elastic member 248 is coupled to the first operation lever 240a and the other end of the elastic member 248 is coupled to the second operation lever 240b. The elastic member 248 may apply an elastic force to the respective operation levers 240 in a direction in which the catch protrusions 242 of the respective operation levers 240 are inserted into the catch recesses 142 of the coupling guides 141.

The operation levers 240 may include pivot-coupling holes 244 coupled to pivots provided to the movement member 21. The operation levers 240 may rotate in opposite directions from each other when being provided in a state to allow movement of the height adjustment unit 20 relative to the fixing unit 10. Accordingly, the elastic member 248 may move or rotate each of the levers 240a and 240b such that each of the levers 240a, 240b touches the coupling guide 141.

Each respective operation lever 240 may be provided with a plurality of coupling holes 246 coupled with the coupling member that has penetrated the coupling holes 23 of the movement member 21.

Operation of the height adjustment unit 20 will now be described.

With respect to the pivot-coupling holes 244, each operation lever 240 may be divided into an upper portion coupled to the elastic member 248, and a lower portion provided with the catch protrusions 242 (to be inserted into the catch recesses 142 of the coupling guides 141).

As shown in FIG. 6, when an external force is not applied to the operation levers 240, the elastic force of the elastic member 248 maintains the state where the catch protrusions 242 of the respective operation levers 240 have been inserted in the catch recesses 142. In this state, the height adjustment unit 20 is maintained at a same position relative to the fixing unit 10 (and to the frame 14).

For a user to adjust the height of the display device in this state, the operation levers 240 are operated in a direction in which the upper portions of the respective operation levers 240 depart from each other.

That is, as shown in FIG. 7, the first operation lever 240a may be pushed to the left side and rotated counter clockwise, and the second operation lever 240b may be pushed to the right side and rotated clockwise. When the respective operation levers 240 are operated, the elastic member 248 may be elongated, and the catch protrusions 242 of the respective operation levers 240 may be released from the catch recesses 142 so as to allow the height adjustment unit 20 to vertically move relative to the fixing unit 10.

While maintaining the state where the respective operation levers 240 have been rotated, the height adjustment unit 20 may be moved to a desired height relative to the fixing unit 10. After that, a force applied to the respective operation levers 240 may be removed, and then a restoring force of the elastic member 248 may cause the upper portions of the respective operation levers 240 to rotate in directions in which the operation levers 240 may be closer to each other. Accordingly, the catch protrusions 242 of the respective operation levers 240 are inserted into the catch recesses 142. The user may couple the coupling member to the respective coupling holes 23 and 246.

FIGS. 8 to 10 are views illustrating operation of a supporting apparatus according to an example embodiment. FIG. 8 is the view illustrating a forward movement operation of a supporting apparatus. FIG. 9 is the view illustrating an up-and-down tilting operation of a supporting apparatus. FIG. 10 is the view illustrating an up-and-down operation of a supporting apparatus. Other embodiments and configurations are also within the scope of the present invention.

FIGS. 11 and 12 are views illustrating back-and-forth operation of the image display panel 500 coupled to the supporting apparatus.

As shown in FIGS. 1, 8, 11 and 12, when the device connecting parts 50 are pulled forward from the state illustrated in FIG. 1, the sliding units 30 coupled to both sides of the height adjustment unit 20 may rotate relative to the height adjustment unit 20.

Then, the device connecting parts 50 may move forward through interaction of the sliding members 310 and 330 respectively forming the sliding units 30. That is, the second sliding members 330 may slide relative to the first sliding members 310.

The sliding units 30 may operate independently from each other. Thus, a sliding length of the sliding unit 30 coupled to one device connecting part 50 may be different from a sliding length of the sliding unit 30 coupled to the other device connecting part 50.

A perpendicular distance between one device connecting part 50 and a wall may be different from or equal to a perpendicular distance between the other device connecting part 50 and the wall.

While the respective device connecting parts 50 move forward, the respective tilting friction parts 40 may rotate relative to the respective sliding units 30. Independent operation of the respective sliding units 30 may allow the display device, installed to the device connecting parts 50, to swivel left and right, for example.

The sliding units 30 may allow the device connecting parts 50 to move forward, and thus a back-and-forth width of the supporting apparatus may be minimized in the state where the device connecting parts 50 has moved backward as shown in FIG. 1. That is, since the second sliding members 330 are inserted into and withdrawn from inner spaces of the first sliding members 310, thicknesses of the sliding units 30 can be reduced, and thus the back-and-forth width of the supporting apparatus can be reduced.

Since the device connecting parts 50 may move forward through the sliding operation of the sliding units 30, while the sliding units 30 rotate relative to the height adjustment unit 20, stress applied to hinge points of the sliding units 30 may be distributed to the respective sliding members 310 and 330, thereby preventing (or minimizing) breakage of the supporting apparatus.

Since the device connecting parts 50 may move back and forth, and left and right on both sides of the fixing unit 10, the fixing unit 10 may be mounted to a wall or a column having a narrow left-and-right width, so that the install position may be diversified.

As shown in FIG. 9, the device connecting parts 50 may be tilted upward or downward relative to the sliding units 30. For example, when the device connecting part 50 is tilted downward, the second arc member 420 may move relative to the first arc member 410. In this case, a rotation angle may be maintained by the friction force provided by the tilting friction part 40 (i.e., by the friction force between the first arc member 410 and the second arc member 420).

In the state where the display device is adjacent to the wall, the display device may be moved forward a predetermined distance before the display device is tilted up and down, thereby preventing a bottom surface of the display device from colliding with the wall during the up-and-down tilting movement.

FIG. 10 shows that the height adjustment unit 20 has moved downward from the state of FIG. 1. At this point, the height adjustment unit 20 may be vertically movable relative to the fixing unit 10, and thus a user can conveniently adjust the height of the display device in the state where the display device is placed on the device connecting parts 50.

The minimum movement distance of the height adjustment unit 20 may correspond to the respective gaps between the catch recesses 142 of the frame 14, and thus a user can precisely adjust the vertical height of the display device to a desired height, thereby suiting the user's taste.

The up-and-down tilting, left-and-right swiveling and back-and-forth movements of the display device may be preformed independently from each other. Thus, a user can independently or simultaneously perform the up-and-down tilting, left-and-right swiveling and back-and-forth movements of the display device. As a result, the user can watch the flat display device at any position and any angle.

The sliding unit may include the first sliding member and the second sliding member that is slidable relative to the first sliding member. However, the sliding unit may also include three or more sliding members. For example, the following configuration may be provided: the first sliding member is coupled to the height adjustment unit; a second sliding member is slidable relative to the first sliding member; and a third sliding member is slidable relative to the second sliding member and is coupled to the tilting friction part.

The sliding units may also couple the height adjustment unit to the device connecting parts, and thus the sliding units may be referred to as connection units for connecting the height adjustment unit to the device connecting parts.

Embodiments may provide a supporting apparatus of a display device that is adapted to achieve a small size, various install positions, and a simple structure.

In an example embodiment, a supporting apparatus of a display device may include: a fixing unit fixed (or maintained) in a mounting position, sliding units rotatably connected to the fixing unit, and a device connecting part connected to the display device and rotatable relative to the sliding unit, wherein the sliding unit includes a first sliding member rotatable relative to the fixing unit, and a second sliding member slidable relative to the first sliding member.

In another example embodiment, a supporting apparatus of a display device may include: a device connecting part configured to support an image display panel; a sliding unit configured to rotate the device connecting part and having a length that varies through sliding of a plurality of sliding members; a height adjustment unit coupled to a side of the sliding unit and that varies a height of the sliding unit; and a fixing unit configured to maintain (or keep) a position of the height adjustment unit.

In a further example embodiment, a supporting apparatus of a display device may include: a fixing unit configured to have a predetermined position; a height adjustment unit configured to move up and down relative to the fixing unit; connection units respectively connected to both sides of the height adjustment unit; and device connecting parts, on which the display device is placed, connected to the respective connection units.

The fixing unit may be disposed in a middle part of the supporting apparatus, and the respective sliding units may rotate on both sides of the fixing unit so that it is minimized that an install position of the supporting apparatus is limited. That is, the fixing unit can be fixed to a narrow wall or a narrow indoor column, and thus the install position of the supporting apparatus may be diversified.

The device connecting parts may move forward through sliding operation of the sliding units. Thus, while the sliding units rotate relative to the height adjustment unit, stress applied to hinge points of the sliding units may be distributed to the respective sliding members, thereby preventing (or minimizing) breakage of the supporting apparatus.

The height adjustment unit may be configured to move up and down relative to the fixing unit, and thus a user can conveniently adjust the height of the display device in the state where the display device is placed on the device connecting parts.

The minimum movement distance of the height adjustment unit may correspond to respective gaps between catch recesses of a frame, and thus a user may precisely adjust the vertical height of the display device to a desired height, thereby meeting the user's taste.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A supporting apparatus of a display device, the apparatus comprising:
    a fixing unit to maintain a mounted position;
    a plurality of sliding units each to rotate relative to the fixing unit, wherein a first one of the sliding units includes a first sliding member to rotate relative to the fixing unit, and a second sliding member to slide relative to the first sliding member; and
    a device connecting part to couple to the display device and to rotate relative to the first sliding member and the second sliding member.

2. The supporting apparatus according to claim 1, wherein a portion of the second sliding member to slide into the first sliding member.

3. The supporting apparatus according to claim 1, wherein the second sliding member slides relative to the first sliding member when the device connecting part moves relative to the fixing unit.

4. The supporting apparatus according to claim 1, wherein the first sliding member includes a sliding guide to guide sliding of the second sliding member relative to the first sliding member, and the second sliding member includes a guide-receiving part to receive the sliding guide.

5. The supporting apparatus according to claim 1, wherein the first one of the sliding units further includes a limit-setting member to set a sliding limit of the second sliding member relative to the first sliding member.

6. The supporting apparatus according to claim 5, wherein the second sliding member includes an opening to receive the limit-setting member, and the opening is elongated along a sliding direction of the second sliding member relative to the first sliding member.

7. The supporting apparatus according to claim 6, wherein the first sliding member includes a through hole to receive the limit-setting member, and the limit-setting member to pass through both the through hole and the opening.

8. The supporting apparatus according to claim 1, further comprising a height adjustment unit to move relative to the fixing unit,
    wherein the first one of sliding units is rotatably coupled to one side of the height adjustment unit and a second one of the sliding units is rotatably coupled to another side of the height adjustment unit.

9. The supporting apparatus according to claim 1, further comprising a tilting friction part between the first one of the sliding units and the device connecting part to allow the device connecting part to be moved relative to the first one of the sliding units, wherein the tilting friction part is rotatable relative to the first one of the sliding units.

10. The supporting apparatus according to claim 9, wherein the tilting friction part comprises:
- a first arc member to couple to the first one of the sliding units; and
- a second arc member to couple to the device connecting part and to move relative to the first arc member.

11. A supporting apparatus of a display device, the apparatus comprising:
- a fixing unit having a frame;
- a device connecting part to support an image display panel;
- a sliding unit to have a length that varies based on sliding of at least one of a plurality of sliding members; and
- a height adjustment unit to couple to the sliding unit, wherein the frame to maintain a position of the height adjustment unit relative to the fixing unit, wherein the plurality of sliding members comprises:
- a first sliding member to rotate relative to the height adjustment unit, and
- a second sliding member to slide relative to the first sliding member.

12. The supporting apparatus according to claim 11, wherein the height adjustment unit comprises:
- a movement member to move along the frame of the fixing unit;
- two operation levers to couple to the movement member; and
- an elastic member to rotate each of the levers such that the levers contact the frame.

13. The supporting apparatus according to claim 11, further comprising a tilting friction part between the sliding unit and the device connecting part, and the tilting friction part to provide a friction force to maintain a position of the device connecting part.

14. A supporting apparatus of a display device, the apparatus comprising:
- a fixing unit having a frame that extends along the fixing unit;
- a height adjustment unit to move relative to the fixing unit, wherein the height adjustment unit includes a plurality of operation levers and an elastic member to couple to each of the respective operation levers and to maintain a position of the height adjustment unit relative to the fixing unit;
- a plurality of device connecting parts to support the display device; and
- a plurality of coupling units to couple to the height adjustment unit and to each of the device connection parts.

15. The supporting apparatus according to claim 14, wherein the height adjustment unit comprises:
- a movement member to move along the frame of the fixing unit;
- the plurality of operational levers coupled to the movement member; and
- the elastic member to move each of the levers such that each lever touches the frame.

16. The supporting apparatus according to claim 15, wherein the frame includes coupling guides provided with concave-convex portions to selectively couple to concave-convex portions of the operational levers based on the elastic member.

17. The supporting apparatus according to claim 14, wherein the operation levers to rotate in opposite directions from each other when being provided into a state to allow movement of the height adjustment unit relative to the fixing unit.

18. The supporting apparatus according to claim 14, wherein the elastic member to apply an elastic force to each of the respective operation levers.

19. The supporting apparatus according to claim 14, wherein the plurality of coupling units comprise a plurality of sliding units between the height adjustment unit and the device connecting parts.

* * * * *